US007358295B2

(12) United States Patent
Miller et al.

(10) Patent No.: US 7,358,295 B2
(45) Date of Patent: Apr. 15, 2008

(54) HYBRID POLYMER COMPOSITION, AND ARTICLE THEREFROM

(75) Inventors: Timothy D. Miller, Brecksville, OH (US); Yona Eckstein, Kent, OH (US); Alexander V. Lubnin, Copley, OH (US); Gary A. Anderle, North Olmsted, OH (US); Shui-Jen Raymond Hsu, Westlake, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 530 days.

(21) Appl. No.: 10/849,582

(22) Filed: May 20, 2004

(65) Prior Publication Data

US 2004/0214937 A1    Oct. 28, 2004

Related U.S. Application Data

(63) Continuation-in-part of application No. 10/174,899, filed on Jun. 19, 2002, now Pat. No. 6,897,281.

(60) Provisional application No. 60/370,135, filed on Apr. 5, 2002.

(51) Int. Cl.
C08J 3/00 (2006.01)
C08K 3/20 (2006.01)
C08L 75/00 (2006.01)
C08F 8/30 (2006.01)
B32B 27/00 (2006.01)

(52) U.S. Cl. .................. 524/507; 206/701; 206/706; 206/707; 206/709; 206/719; 206/723; 211/41.17; 428/34.1; 428/35.7; 428/35.8; 428/36.8; 428/36.92; 428/423.1; 525/123; 525/455

(58) Field of Classification Search ............. 524/507; 525/123, 455; 428/423.1, 34.1, 35.7, 35.8, 428/36.8, 36.92; 211/41.17; 206/701, 706, 206/707, 709, 719, 723
See application file for complete search history.

(56) References Cited

U.S. PATENT DOCUMENTS

| | | | |
|---|---|---|---|
| 2,438,091 A | 3/1948 | Lynch | |
| 2,528,378 A | 10/1950 | Mannheimer | |
| 2,658,072 A | 11/1953 | Kesmin | |
| 3,755,560 A | 8/1973 | Dickert | |
| 3,905,929 A | 9/1975 | Noll | |
| 3,920,598 A | 11/1975 | Reiff et al. | |
| 4,092,286 A | 5/1978 | Noll et al. | |
| 4,190,566 A | 2/1980 | Noll et al. | |
| 4,292,420 A | 9/1981 | Turner et al. | |
| 4,302,558 A | 11/1981 | Ohya et al. | |
| 4,384,078 A | 5/1983 | Ohya et al. | |
| 4,421,769 A | 12/1983 | Dixon et al. | |
| 4,543,390 A | 9/1985 | Tanaka et al. | |
| 4,670,330 A | 6/1987 | Ishiwata | |
| 4,704,272 A | 11/1987 | Oh et al. | |
| 4,741,855 A | 5/1988 | Grote et al. | |
| 4,769,856 A | 9/1988 | Reed | |
| 4,788,006 A | 11/1988 | Bolich, Jr. et al. | |
| 4,920,176 A | 4/1990 | Jorgensen, Jr. | |
| 4,925,732 A | 5/1990 | Driskill et al. | |
| 4,983,662 A | 1/1991 | Overbeek et al. | |
| 4,992,507 A | 2/1991 | Coogan et al. | |
| 5,011,681 A | 4/1991 | Ciotti et al. | |
| 5,043,381 A | 8/1991 | Coogan et al. | |
| 5,073,372 A | 12/1991 | Turner et al. | |
| 5,177,141 A | 1/1993 | Thoma et al. | |
| 5,378,405 A | 1/1995 | Gutman et al. | |
| 5,380,528 A | 1/1995 | Alban et al. | |
| 5,599,549 A | 2/1997 | Wivell et al. | |
| 5,700,867 A | 12/1997 | Ishiyama et al. | |
| 5,716,676 A | 2/1998 | Schutze et al. | |
| 5,747,582 A | 5/1998 | Schutze et al. | |
| 5,874,095 A | 2/1999 | Deckner et al. | |
| 5,883,085 A | 3/1999 | Blank et al. | |
| 5,885,708 A | 3/1999 | Lu et al. | |
| 5,948,416 A | 9/1999 | Wagner et al. | |
| 5,993,839 A | 11/1999 | Mixon | |
| 5,998,546 A | 12/1999 | Li et al. | |
| 6,013,271 A | 1/2000 | Doughty et al. | |
| 6,017,997 A | 1/2000 | Snow et al. | |

(Continued)

FOREIGN PATENT DOCUMENTS

EP    0 595 149 A1    10/1993

(Continued)

OTHER PUBLICATIONS

Tate, D.P. et al., Encyclopedia of Polymer Science & Engineering, vol. 2, "Anionic Polymerization to Cationic Polymerization", pp. 537-590.

(Continued)

Primary Examiner—Patrick Niland
(74) Attorney, Agent, or Firm—Joe A. Powell; Samuel B. Laferty; Thoburn T. Dunlap

(57) ABSTRACT

An anti-static polymer composition comprises a thermoformable, moldable, hybrid urethane-vinyl polymer composition which exhibits relatively low surface and volume resistivities and good toughness. The hybrid polymer composition can be made without volatile organic compounds such as solvents, neutralizing amines, or both.

47 Claims, No Drawings

U.S. PATENT DOCUMENTS

| | | | |
|---|---|---|---|
| 6,020,438 | A | 2/2000 | Lubnin et al. |
| 6,140,405 | A | 10/2000 | Eckstein et al. |
| 6,576,702 | B2 | 6/2003 | Anderle et al. |
| 2003/0195293 | A1 | 10/2003 | Lubnin et al. |
| 2004/0214937 | A1 | 10/2004 | Miller et al. |

FOREIGN PATENT DOCUMENTS

| | | |
|---|---|---|
| WO | WO 02/02657 A2 | 1/2002 |
| WO | WO 02/02657 A3 | 1/2002 |
| WO | WO 02/08327 A1 | 1/2002 |

OTHER PUBLICATIONS

Lovell, Peter A. et al., Emulsion Polymerization & Emulsion Polymers, Chapters 1 and 6, J. Wiley & Sons, 1997, pp. 4-35 and 208-237.

Ottewill, R.H. et al., Colloid & Polymer Science, vol. 266, No. 6, "Nonionic Latices in Aqueous Media Part 2: Stability to Added Electrolytes", 1988, pp. 547-553.

Kirk-Othmer Encyclopedia of Chemical Technology, Third Edition, vol. 20, "Rubber Compounding", 1982, pp. 453-454.

Ottewill, R.H. et al., Emulsion Polymerization and Emulsion Polymers, Editors: Lovell, P.A. et al., J. Wiley & Sons, 1997, pp. 104-106.

Ishizu, K. et al., Journal of Polymer Science: Part A: Polymer Chemistry, vol. 42, "Controlled Radical Polymerization of 2-Hydroxyethyl Methacrylate Initiated by Photofunctional 2-(N,N-Diethyldithiocarbrnyl)isobutyric Acid", 2004, pp. 76-82.

Ishizu, K. et al., Journal of Applied Polymer Science, vol. 91, "Controlled Radical Polymerization of N-Isopropylacrylamide Initiated by Photofunctional 2-(N,N-Diethyldithiocarbamyl)isobutyric Acid Sodium Salt in Aqueous Medium", 2004, pp. 3233-3238.

Todd, Charles et al., "Volatile Silicone Fluids for Cosmetics, Cosmetics and Toiletries", vol. 91, Jan. 1976, pp. 29-32.

Department of Health And Human Services, Federal Register, vol. 64, No. 98, May 21, 1999, pp. 27666-27693.

Silke Dederichs et al., European Coatings Journal, 2002, (5), pp. 51-52, 54-56 and 58, "Tailor Made Polyether Diols".

HYBRID POLYMER COMPOSITION, AND ARTICLE THEREFROM

CROSS REFERENCE

This is a continuation-in-part of application Ser. No. 10/174,899, filed Jun. 19, 2002, now U.S. Pat. No. 6,897,281 which in turn claims a priority date of U.S. Provisional Application No. 60/370,135 filed Apr. 5, 2002.

FIELD OF INVENTION

An aspect of the present invention relates to a composition comprising at least one vinyl polymer, at least one waterborne polyurethane, an optional fluorocarbon, and optionally an electrostatic dissipating compound. More specifically the invention relates to such a composition having desirable electrostatic dissipating properties which can be utilized as a coating for articles and the like.

BACKGROUND OF THE INVENTION

U.S. Pat. No. 5,700,867 relates to an aqueous polyurethane dispersion having an ionic functional group, polyoxyethylene units and hydrazine groups and used as a composition for ink, coating or adhesive. The polyoxyethylene units can be in the main chain, at the end of the main chain or in side-chains of the aqueous polyurethane. The content of polyoxyethylene units is about 20% by weight or less of the weight of the resin.

U.S. Pat. No. 5,043,381 relates to an aqueous dispersion of a nonionic water-dispersible polyurethane having pendant polyoxyethylene chains and one crosslink per 3,000 to 100,000 atomic weight units. U.S. Pat. No. 4,992,507 relates to an aqueous dispersion of a nonionic, water-dispersible polyurethane having pendant polyoxyethylene chains and free acid or free tertiary amino groups. Diols and diisocyanates having pendant polyoxyethylene chains are mentioned generally in both of the latter two patents, such as those in U.S. Pat. Nos. 3,905,929 and 3,920,598 respectively.

U.S. Pat. No. 4,983,662 relates to an aqueous self-crosslinkable coating composition comprising an aqueous dispersion of at least one polyurethane and having hydrazine (or hydrazone) functional groups and carbonyl functional groups disposed therein to provide a selfcrosslinkable reaction, in which the polyurethane polymer takes part, via azomethine formation during and/or after film formation.

U.S. Pat. No. 4,190,566 relates to non-ionic, water-dispersible polyurethanes having a substantially linear molecular structure and lateral polyalkylene oxide chains having about 3 to 30% by weight of lateral polyalkylene oxide polyether chains. The chains consist of about 40-95% ethylene oxide units and 5-60% certain other alkylene oxide units selected from the group consisting of propylene oxide, butylene oxide and styrene oxide).

U.S. Pat. No. 4,092,286 relates to water-dispersible polyurethane elastomers having a substantially linear molecular structure, characterized by (a) lateral polyalkylene oxide units of from about 0.5 to 10% by weight, based on the polyurethane as a whole and (b) a content of =N$^+$=, —COO$^-$ or —SO$_3^-$ groups of from about 0.1 to 15 milliequivalents per 100 g.

Electrostatic Dissipating (ESD) polymers have been used to impart a level of conductivity sufficient to render the plastics static dissipative and used for abatement of static electricity as in electronic applications. ESD polymers can be polyether elastomers which have surface resistivities of $1\times10^3$ to $1\times10^{12}$ ohm/square and volume resistivities from $1\times10^4$ to $1\times10^{11}$ ohm-cm. Examples include poly(ethylene oxide)-based polyurethanes, polyether amides and polyether esters, and copolymers of ethylene oxide such as ethylene oxide/propylene oxide or ethylene oxide/epichlorohydrin, and the like.

SUMMARY OF THE INVENTION

A composition such as a polymeric dispersion or solution having good antistatic properties upon drying, comprises a blend of at least one vinyl polymer such as an acrylic polymer, at least one polyurethane, optionally an electrostatic dissipating compound, and optionally a lubricant. The vinyl polymer contains at least one macromer which is derived from at least one alkylene oxide having at least one functional group capable of free radical transformation, optionally at least one ethylenically unsaturated monomer having at least one carboxylic acid group, and at least one free radical polymerizable comonomer. The polyurethane comprises at least one polymer derived from at least one side-chain alkylene oxide monomer, at least one hydroxyl or amine containing compound such as a polyol or a polyamine, optionally one or more dispersion enhancing compounds or monomers, desirably a chain extender, and at least one polyisocyanate.

Coatings made from the above compositions of one or more vinyl polymers and water dispersible or water reducible (solution) polyurethanes have good optical clarity, toughness, electrostatic dissipating properties and thermoformability. A preferred use is a coating on a polymer substrate. For example, the antistatic polymer composition can be utilized in electronic and semi-conductor packaging, clean room components and articles, hard disc drive components and packaging, optical devices and films, and the like.

DETAILED DESCRIPTION

Polymer Blend

An important aspect of the present invention to form a hybrid urethane-vinyl polymer composition as a solution, or preferably a dispersion by blending, etc., a polyurethane dispersion with one or more vinyl polymers such as the acrylic polymers disclosed in U.S. patent application Ser. No. 09/609,077 filed Jun. 30, 2000 which is hereby fully incorporated by reference with regard to all aspects thereof. While the vinyl polymer component such as the acrylic polymer will be discussed with regard to a polymer blend, it will be understood that other compositions can be utilized such as wherein the above noted urethane is utilized as a seed polymer, and the like. The amount of the dry vinyl polymer is generally from 10% or about 20% or about 45% to about 95% by weight, and preferably from about 60% or about 80% to about 93% by weight, based upon the total dry weight of the vinyl polymer and the polyurethane combined. More specifically, the amount of the vinyl polymer is utilized to provide a suitable or desirable electrical resistivity as discussed herein below.

Vinyl Polymer

The vinyl polymer is desirably an acrylic polymer (in solution or dispersion form) comprising (a) at least one reactive macromer containing at least one alkylene oxide and having at least one functional group capable of free-radical transformation, (b) optionally, one or more ethylenically unsaturated monomers having at least one carboxylic acid group, and (c) optionally, one or more free radically polymerizable comonomers.

More specifically, the (a) at least one reactive macromer of at least one alkylene oxide having at least one functional group capable of free-radical transformation is reacted to form solutions or dispersions with (b) optionally, one or more ethylenically unsaturated monomers having at least one carboxylic acid group, and (c) one or more free radically polymerizable vinyl monomers which contain one or more carbon-carbon double bond (C=C) as a polymerizable moiety. Examples of such monomers include esters, nitriles, amides of acrylic, methacrylic, itaconic, maleic, fumaric, and other carboxylic acids; olefins; halogenated olefins, conjugated dienes; halogenated conjugated dienes; styrenic monomers; vinyl esters; vinyl ethers; unsaturated esters of phosphoric acid; or derivatives thereof, as well as other polar or functional monomers.

The following definitions apply throughout this vinyl polymer section. All weight percentages of polymers, latexes, and other materials are expressed on a dry weight basis. The term "polymer" refers to homopolymers as well as copolymers. The term "polymerized units" means polymerized monomeric molecules, e.g., polybutadiene can be said to comprise polymerized units or molecules of butadiene monomer.

Reactive (a) macromers of alkylene oxides having at least one functional group capable of free-radical transformation are well known in the prior art. Such macromers have the formula (I):

X—(Y—O)$_n$—Z    (I)

wherein Y is a straight or branched chain alkylene radical having 1 to 6 carbon atoms, preferably 2 to 4 carbon atoms, X is a functional group capable of free-radical transformation, such as acrylate, which may be represented by the formula H$_2$C=CHC(O)O—, methacrylate, which may be represented by the formula H$_2$C=C(CH$_3$)C(O)O—, allyl ether, which may be represented by the formula H$_2$C=CHCH$_2$O—, vinyl ether, which may be represented by the formula H$_2$C=CHO—, vinylbenzyl, vinylsulfonic ester, which may be represented by the formula H$_2$C=CHSO$_3$—, or mercaptan, Z is H; C$_m$H$_{2m+1}$; phosphate; or the same as X, and m is 1 to 50 or 1 to 8, preferably 1 to 3. "n" may vary to achieve the desired molecular weight (number average) set forth below. Z is preferably H or methyl. X is preferably acrylate or methacrylate. Examples of suitable reactive monomers include methoxy polyethylene oxide (meth)acrylate (also known as methoxypolyethylene glycol methacrylate or "MePEGMA"), methoxy polyethylene oxide allyl ether, polyethylene oxide allyl ether, butoxy polyethylene oxide (meth)acrylate, p-vinylbenzyl terminated polyethylene oxide, polyethylene oxide di(meth)acrylate, polyethylene oxide thiol, polyethylene oxide maleimide, polyethylene oxide vinylsulfone, and the like. Mixtures of the macromers may also be used. Preferred macromers include methoxy polyethylene oxide (meth)acrylate, methoxy polyethylene oxide allyl ether, and polyethylene oxide allyl ether. Suitable reactive macromers can have number average molecular weights from about 100 to about 10,000, preferably from about 100 to about 5,000, and more preferably from about 300 to about 2,000. Such monomers provide for the nonionic stabilization of the acrylic polymer systems.

A preferred macromer of alkylene oxide is methoxypolyethyleneglycol methacrylate also known as methoxy polyethylene oxide (meth)acrylate, (MePEGMA) available as Bisomer S10W. Its structural formula is:

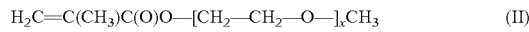

H$_2$C=C(CH$_3$)C(O)O—[CH$_2$—CH$_2$—O—]$_x$CH$_3$    (II)

wherein x is generally from about 12 to about 28 and preferably from about 18 to about 23.

The optionally at least one (b) ethylenically unsaturated monomer has at least one carboxylic acid group, preferably one or two carboxylic acid groups, and a total of from 4 to 15 carbon atoms. Examples of such monomers include acrylic acid, methacrylic acid, itaconic acid, maleic acid, maleic anhydride, fumaric acid, crotonic acid, vinylacetic acid, mesaconic acid, citraconic acid, 2-acrylamido-2-methylpropanesulfonic acid, alkali metal salts of the above acids and amine or ammonium salts thereof. Acrylic acid and methacrylic acid are preferred as noted above.

The above noted one or more (c) free-radically (or "radically") polymerizable optional but desired comonomers useful in preparing the vinyl polymer compositions of the present invention include the esters, nitriles, amides of acrylic, methacrylic, itaconic, maleic, fumaric, and other carboxylic acids; olefins; halogenated olefins, conjugated dienes; halogenated conjugated dienes; styrenic monomers; vinyl esters; vinyl ethers; unsaturated esters of phosphoric acid; or derivatives thereof, as well as other polar or functional monomers.

Of the various esters, nitriles, and amides of the above-noted carboxylic acids, the esters of acrylic acid and methacrylic acid are highly preferred. Acrylic acid esters and methacrylic acid esters useful in preparing acrylic compositions include those having of formula III:

(III)

wherein R$^1$ is hydrogen or a methyl group, and R$^2$ contains 1 to 50 carbon atoms and optionally also one or more sulfur, nitrogen, halogen or oxygen atoms. Preferably R$^2$ is an ethyl or butyl group. Examples of suitable acrylate esters include methyl acrylate, ethyl acrylate, n-propyl acrylate, isopropyl acrylate, n-butyl acrylate, 2-ethylhexyl acrylate, and n-decyl acrylate. Examples of suitable methacrylate esters include methyl (meth)acrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-butoxyethyl (meth)acrylate, 2-chloroethyl (meth)acrylate, sec-butyl-(meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate, hexofluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth) acrylate, 2-phenoxyethyl (meth)acrylate, 2-phenylethyl (meth)acrylate, phenyl (meth)acrylate, propargyl (meth) acrylate, tetrahydrofurfuryl (meth)acrylate, norbornyl (meth)acrylate, acrylamide and its derivatives, and tetrahydropyranyl (meth)acrylate. Mixtures of acrylic and methacrylic acid esters may be used. The polymerized acrylic and methacrylic acid esters typically may comprise from 0 or 0.1 wt. % to about 99 wt. %, from 20 wt. % to about 95 wt. %, and more preferably from 50 wt. % to about 90 wt. %, of the vinyl polymer dry weight.

The styrenic monomers can be defined as monomers containing a carbon-carbon double bond in alpha-position to an aromatic ring. The styrenic monomers may be represented by the following formulae

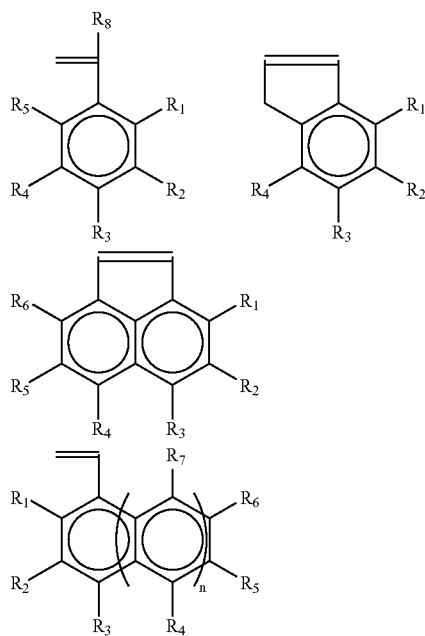

wherein n is an integer from 0 to 2; $R^1$, $R_2$, $R_3$, $R_4$, $R_5$, $R_6$, and $R_7$ are selected from the group consisting of H, $CH_3$, $C_mH_{2m+1}$, OH, $OCH_3$, $OC_mH_{2m+1}$, COOH, $COOCH_3$, $COOC_mH_{2m+1}$, Cl and Br, m is an integer from 2 to 9, and $R_8$ is selected from the group consisting of H, $CH_3$, $C_mH_{2m+1}$, and $C_6H_5$.

Examples of suitable styrenic monomers useful in preparing the acrylic compositions include styrene, alpha-methylstyrene, tertiary butylstyrene, ortho-, meta-, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinyl-naphthalene, vinyl (alkyl-naphthalenes) and vinyl (halonaphthalenes) and mixtures thereof, acenaphthylene, diphenylethylene, and vinyl anthracene. Mixtures of styrenic monomers also may be used. Styrene is preferred. The polymerized styrenic monomers typically may comprise from 0 or 0.1 wt. % to about 60 wt. %, preferably from about 5 wt. % to about 40 wt. %, of the vinyl polymer dry weight.

Vinyl ester monomers derived from carboxylic acids containing 1 to 14 carbon atoms also may be useful in preparing the vinyl compositions. Examples of such vinyl ester monomers include vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate, and the like, as well as mixtures thereof. The polymerized vinyl ester monomers typically may comprise from 0 or 0.1 wt. % to about 99.9 wt. %, preferably from 0 or 0.1 wt. % to about 30 wt. %, of the vinyl polymer dry weight.

Vinyl ethers may be useful in preparing the acrylic compositions. Examples of vinyl ethers include methyl-, ethyl-, butyl, iso-butyl vinyl ethers and the like. The polymerized vinyl ether monomers typically may comprise from 0 or 0.1 wt. % to about 50 wt. %, preferably from 0 or 0.1 wt. % to about 30 wt. %, of the vinyl polymer dry weight.

Conjugated diene monomers containing 4 to 10 carbon atoms, and preferably from 4 to 6 carbon atoms, also may be useful in preparing the acrylic compositions. Examples of such conjugated diene monomers include butadiene, isoprene, cis-1,3-pentadiene, trans-1,3-pentadiene, cis-1,3-hexadiene, trans-1,3-hexadiene, 2-ethylbutadiene, 2-n-propylbutadiene, 2-i-propyl butadiene, 2-t-butylbutadiene, 2-amylbutadiene, 2-n-octylbutadiene, 4-methylpentadiene, cis-3-methylpentadiene, trans-3-methylpentadiene, cis-2-methylpentadiene, trans-2-methylpentadiene, 2,3-dimethylbutadiene, cis,cis-2, 4-hexadiene, cis,trans-2,4-hexadiene, trans,trans-2,4-hexadiene, 2-methyl-3-ethylbutadiene, 2-methyl-3-i-propylbutadiene, 2-methyl-3-n-butylbutadiene, myrcene, cis-1-phenylbutadiene, trans-1-phenylbutadiene, 2-phenyl butadiene, 1,3-cyclopentadiene, 1,3-cyclohexadiene, 2-fluorobutadiene, 1-chlorobutadiene, 2-chlorobutadiene, 2,3-dichlorobutadiene, 2-bromobutadiene, sorbic acid, cis-1-cyanobutadiene, 2-methoxybutadiene and like, as well as mixtures thereof. Butadiene is more preferred. The polymerized conjugated diene monomers typically may comprise from 0 or 0.1 wt. % to about 50 wt. % and preferably from 0 or 0.1 wt. % to about 10 wt. %, of the vinyl polymer dry weight.

Various halogenated conjugated diene monomers can also be utilized such as neoprene, that is 2-chloro-1,3-butadiene, as well as other various other chlorinated dienes set forth in the proceeding paragraph. The amount of such halogenated conjugated dienes is generally the same as the conjugated diene monomers.

The olefin monomers generally have from 2 to about 10 carbon atoms such as ethylene, propylene, butane, pentene, hexane, and various isomers thereof. Preferred olefin monomers generally include ethylene and propylene. Various halogenated olefins can also be utilized such as vinyl chloride, vinylidene chloride, vinyl fluoride, or vinylidene fluoride, and the like.

Another group of vinyl monomers are the various unsaturated esters of phosphoric acid such as monomethylacrylate monofluorophosphate, hydroxy ethyl methacrylate phosphate, and the like.

Other monomers may be useful in preparing the vinyl compositions, including polar or functional monomers such as hydroxyalkyl (meth)acrylates, acrylamides and substituted acrylamides, sodium styrene sulfonate and sodium vinyl sulfonate, N-vinyl-2-pyrrolidone, N-vinyl caprolactam, diallyl phthalate, dimethyl aminoethyl (meth)acrylate, and dimethylaminopropyl methacrylamide. Dimethyl acrylamide, dimethyl aminoethyl acrylamide, dimethyl aminoethyl (meth)acrylate, and dimethylaminopropyl methacrylamide are preferred. Mixtures of polar monomers also may be used. The polymerized polar monomers typically may comprise from 0 or 0.1 wt. % to about 30 wt. %, preferably from about 1 wt. % to about 20 wt. %, of the acrylic polymer dry weight.

While one or more of any of the above (c) free radically polymerizable vinyl monomers can be utilized, it is a highly preferred embodiment of the present invention that at least one acrylic ester or methacrylic ester be utilized such that a hybrid acrylic polymer-urethane composition is formed.

Polymerizable macromers (a) generally result in water soluble polymers or emulsion polymers containing non-water soluble particles, typically can comprise from about 0.1 wt. % to about 99.5 wt. % or about 100 wt. %, and preferably from about 1 wt. % to about 30 wt. % or about 50 wt. %, or about 70 wt. % of the total dry weight of the acrylic polymers. Polymerizable ethylenically unsaturated monomers having at least one carboxylic acid group (b) typically may comprise from 0 or about 0.1 wt. % to about 10 wt. %, preferably from about 1 wt. % to about 5 wt. %, of the total dry weight of the acrylic polymers. Polymerized monomers (c) typically may comprise from 0 or about 0.1 wt. % to about 99.9 wt. %, preferably from about 20 wt. % or about 40 wt. %, or about 50 wt. % to about 70 wt. % or about 90 wt. %; or about 95 wt. %; or about 70 wt. %, of the total dry weight of the vinyl or acrylic polymers.

The vinyl or acrylic compositions may be prepared by free radical polymerization methods well known to those skilled in the art, such as described in "Emulsion Polymerization and Emulsion Polymers" (Editors: P. A. Lovell and M. S. El-Aaser), J. Wiley & Sons (1997).

Well-known initiators are used in preparing the vinyl or acrylic compositions such as a persulfate initiator, and most preferably sodium persulfate. Other initiators suitable for use include ammonium persulfate, potassium persulfate, peroxides, azo compounds, and known redox initiators such as tert-butyl hydroxy peroxide/sodium formaldehyde sulfoxylate. The initiator for preparing the vinyl or acrylic compositions is preferably present in an amount from about 0.01 or about 0.2 wt. % to about 2 wt. % based on the total dry weight of the vinyl or acrylic polymer.

Well-known crosslinking and branching agents may be useful in preparing the vinyl or acrylic compositions such as multifunctional (meth)acrylates, (meth)acrylamides, and vinyl and allyl ethers. Examples include ethylene glycol dimethacrylate, 1.6-hexanedioldiacrylate, methylene bis-acrylamide, polybutadiene diacrylates, polyurethane diacrylates, trimethylolpropane trimethacrylate, pentaerythritol tetraallyl ether, allyl methacrylate, allyl acryloxypropionate, 4-acryloxybenzophenone, diallyl maleate, divinylbenzene, and the like. Mixtures of crosslinking and branching agents may also be used.

Another optional ingredient in the preparation of the vinyl or acrylic compositions is a chain transfer agent. Useful agents include alcohols, mercaptans, halogenated compounds and mixtures thereof. Preferred agents are mercaptans. Where used, the chain transfer agent is present in an amount from about 0.1 wt. % to about 3 wt. %, preferably from about 0.1 wt. % to about 0.5 wt. % based on the total weight of the vinyl or acrylic polymer.

The amount of solids of the vinyl or acrylic polymer solution is from about 5 or about 10 to about 50% and preferably from about 15 to about 40% solids based upon a total weight of the vinyl or acrylic solution without any additives therein.

The vinyl or acrylic composition can contain various additives known to the art and to the literature in conventional amounts such as activators, stabilizers, plasticizers, cross-linking and branching agents, pigments, colorants, neutralizing agents, waxes, slip and release agents, antimicrobial agents, surfactants, metals, antioxidants, UV stabilizers, antiozonants, and the like.

A preferred acrylic polymer composition comprises a blend of styrene, n-butyl acrylate, MePEGMA, methyl methacrylate and methacrylic acid.

The preferred acrylic composition was made by first making a monomer premix containing water, a surfactant, styrene, n-butyl acrylate, methylmethacrylate, an aqueous solution of MePEGMA, mercaptan chain transferred agent, and methacrylic acid. An initiator A solution was made by dissolving sodium persulfate in water. An initiator B solution was made by also dissolving sodium persulfate in water. A surfactant was charged to a vessel and heated. Initiator solution A was then added to the reaction vessel followed by proportioning the monomer premix into vessel for a period of a few hours. After reaction, initiator solution B was proportioned into the reaction vessel for a period of hours. After completion of the initiator feed, an aqueous solution of an electrostatic dissipating salt such as lithium nitrate was added to the vessel and an elevated temperature was maintained. The reaction vessel was then cooled to above ambient and an initiator and a reducing agent were added several minutes apart. After a period of time the reaction vessel was cooled to room temperature and the pH adjusted utilizing a base.

Specific examples of preparation of the acrylic composition are set forth in U.S. application Ser. No. 09/609,077 filed Jun. 30, 2000 which is hereby fully incorporated by reference with examples 2, and 18 through 21 being preferred.

Polyurethane Dispersions

The polyurethanes of the present invention are made by reacting a plurality of active hydrogen-containing compounds or monomers with one or more polyisocyanates.

A process for making a waterborne polyurethane comprises:

(A) reacting to form an isocyanate-terminated prepolymer (1) at least one polyisocyanate having an average of about two or more isocyanate groups; (2) at least one active hydrogen-containing or isocyanate reactive compound, comprising poly(alkylene oxide) side-chain units, in an amount comprising about 12 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is at least about 12 wt. % when the molecular weight of said side-chain units is more than about 1,000 grams/mole; (the (2) side chain monomers generally provide for the nonionic stabilization of the polyurethane system); (3) preferably at least one other active hydrogen-containing or isocyanate reactive compound not containing poly(alkylene oxide) side-chain units such as a hydroxyl (e.g. a polyol) or an amine containing compound; and (4) optionally at least one dispersion enhancing monomer optionally capable of crosslinking, in order to form an isocyanate-terminated prepolymer;

(B) dispersing said prepolymer in water, and chain extending said prepolymer by reaction with at least one of water, inorganic or organic polyamine having an average of about 2 or more primary and/or secondary amine groups, polyalcohols, ureas, or combinations thereof; and (C) thereafter further processing the chain-extended dispersion of step (B) in order to form a composition or article.

In addition to the above process, other processes include an acetone process, a melt dispersion process, a ketazine and ketimine process, a continuous polymerization process, a reverse feed process, a solution polymerization, a bulk polymerization, all are set forth in U.S. patent application Ser. No. 10/174,899, hereby fully incorporated by reference.

The compositions of the present invention are conveniently referred to as polyurethanes because they contain urethane groups. They can be more accurately described as poly(urethane/urea)s if the active hydrogen-containing compounds are polyols and polyamines. It is well understood by those skilled in the art that "polyurethanes" is a generic term used to describe polymers obtained by reacting isocyanates with at least one hydroxyl-containing compound, amine-containing compound, or mixture thereof. It also is well understood by those skilled in the art that polyurethanes also include allophanate, biuret, carbodiimide, oxazolidinyl, isocyanurate, uretdione, and other linkages in addition to urethane and urea linkages.

As used herein, the term "wt. %" means the number of parts by weight of monomer per 100 parts by weight of polymer on a dry weight basis, or the number of parts by weight of ingredient per 100 parts by weight of specified composition. As used herein, the term "molecular weight" means number average molecular weight.

Polyisocyanates

Suitable polyisocyanates of the present invention have an average of about two or more isocyanate groups, desirably an average of about two to about four isocyanate groups and include aliphatic, cycloaliphatic, araliphatic, and aromatic polyisocyanates, used alone or in mixtures of two or more. Diisocyanates are preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate and isomers thereof, naphthalene diisocyanate, and the like. Preferred aromatic polyisocyanates include toluene diisocyanate and MDI (diphenylmethylene diisocyanate).

Highly preferred diisocyanate include dicyclohexylmethane diisocyanate and isophorone diisocyanate.

Active-Hydrogen Containing or Isocyanate Reactive Compounds

The waterborne polyurethane of the present invention desirably is derived from at least two active hydrogen-containing or isocyanate reactive compounds which can be any of the monomers set forth hereinbelow. Desirably at least one monomer is a side-chain containing aklyene oxide monomer, at least another monomer is a polyol, or an amine. Other suitable monomers include various dispersion enhancing monomers By the term "active hydrogen-containing" or "isocyanate reactive" compounds it is meant monomers which can react with isocyanate groups via the following reaction: —NCO+ H—X—→NH—C(=O)—X. Such active hydrogen-containing monomers or isocyanate reactive polymers include, but are not limited to the following.

Side-Chain Containing Alkylene Oxide Monomers

As used herein, the term "alkylene oxide" includes both alkylene oxides and substituted alkylene oxides having 2 to 10 carbon atoms. The active hydrogen-containing compounds used in this invention have an amount of poly (alkylene oxide) side-chains compounds comprising about 12 wt. % to about 80 wt. %, preferably about 14 wt. % to about 60 wt. %, and more preferably about 15 wt. % to about 50 wt. %, of poly(alkylene oxide) units of the total dry weight of polyurethanes. At least about 50 wt. %, preferably at least about 70 wt. %, and more preferably at least about 90 wt. % of the poly(alkylene oxide) side-chain units comprise poly(ethylene oxide), and the remainder of the side-chain poly(alkylene oxide) units can comprise alkylene oxide and substituted alkylene oxide units having from 3 to about 10 carbon atoms, such as propylene oxide, tetramethylene oxide, butylene oxides, epichlorohydrin, epibromohydrin, allyl glycidyl ether, styrene oxide, and the like, and mixtures thereof. The term "final polyurethane" means the polyurethane produced after formation of the prepolymer followed by the chain extension step as described more fully hereafter.

Compounds of poly(alkylene oxide) side-chains are known to those skilled in the art and can be incorporated into any of the immediately below noted polyols or polyamines by methods well known to the art. Examples of such active hydrogen-containing compounds include various diols having repeat units of poly(alkylene oxide) side-chain (e.g. from about 5 to about 50 and desirably from about 15 or about 20 to about 30 or about 40) such as those described in U.S. Pat. No. 3,905,929 (hereby incorporated by reference in its entirety). Further, U.S. Pat. No. 5,700,867 (incorporated herein by reference in its entirety) teaches methods for incorporation of poly(ethylene oxide) side-chains at col. 4, line 35 to col. 5, line 45. A preferred active hydrogen-containing compound having poly(ethylene oxide) side-chains is trimethylol propane monoethoxylate methyl ether, available as Tegomer D-3403 from Degussa-Goldschmidt. Tegomer D-3403 generally has an average side chain degree of polymerization of about 24 to about 26 ethylene oxide repeat units. The number average molecular weight of the preferred side-chain containing alkylene oxide monomers is generally from about 350 to about 5,000, and preferably from about 750 to about 2,000.

Hydroxyl or Amine Containing Compounds
(Polyols or Polyamines)

Polyols

Another active hydrogen-containing class or isocyanate reactive compounds which are suitable in the present invention include at least one "polyol" having a number average molecular weight of from about 500 or about 6,000, and desirably from about 1,000 to about 3,000. The polyols generally include higher polymeric polyols such as a polyester polyol, a polyether polyol, a polyhydroxy polyester amide, a hydroxyl-containing polycaprolactone, a hydroxyl-containing acrylic polymer, a hydroxyl-containing epoxide, a polyhydroxy polycarbonate, a polyhydroxy polyacetal, a polyhydroxy polythioether, a polysiloxane polyol, an ethoxylated polysiloxane polyol, a polybutadiene polyol, a hydrogenated polybutadiene polyol, a polyacrylate polyol, a polymethacrylate polyol, a halogenated polyester or polyether, and combinations thereof, and mixtures thereof. The polyester polyols, polyether polyols, polycarbonate polyols, and ethoxylated polysiloxane polyols are preferred.

The polyester polyols typically are esterification products prepared by the reaction of organic polycarboxylic acids or their anhydrides with a stoichiometric excess of a diol. Examples of suitable polyols for use in the reaction include poly(glycol adipate)s, poly(ethylene terephthalate) polyols, polycaprolactone polyols, orthophthalic polyols, sulfonated and phosphonated polyols, and the like, and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethyl-cycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

The aforementioned diols useful in making polyester polyols can also be used as a reactant to prepare the isocyanate terminated prepolymer.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic or aromatic dibasic acids.

The preferred polyester polyol is a diol. Preferred polyester diols include poly(butanediol adipate); hexane diol adipic acid and isophthalic, acid polyesters such as hexane adipate isophthalate polyester; hexane diol neopentyl glycol adipic acid polyester diols, e.g., Piothane 67-3000 HNA (Panolam Industries) and Piothane 67-1000 HNA; as well as propylene glycol maleic anyhydride adipic acid polyester diols, e.g., Piothane 50-1000 PMA; and hexane diol neopentyl glycol fumaric acid polyester diols, e.g., Piothane 67-500 HNF. Other preferred polyester diols include Rucoflex™ S1015-35, S1040-35, and S-1040-110 (Bayer Corporation).

Polyether diols may be substituted in whole or in part for the polyester diols. Polyether polyols are obtained in known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, styrene oxide, tetrahydrofuran, epichlorohydrin, and the like, and mixtures thereof. Preferred polyethers have from 3 to 6 carbon atoms in the repeat group and include poly(propylene glycol), poly(tetrahydrofuran), and copolymers of poly(ethylene glycol) and poly(propylene glycol) with poly(tetrahydrofuran) being highly preferred.

Polycarbonates include those obtained from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene.

Polyacetals include the compounds that can be prepared from the reaction of (A) aldehydes, such as formaldehyde and the like, and (B) glycols such as diethylene glycol, triethylene glycol, ethoxylated 4,4'-dihydroxy-diphenyldimethylmethane, 1,6'-hexanediol, and the like. Polyacetals can also be prepared by the polymerization of cyclic acetals.

Highly preferred polyols are the various polyethers such as poly(tetrahydrofuran).

Polyamines

Instead of a long-chain polyol, a long-chain amine may also be used to prepare the isocyanate-terminated prepolymer. Suitable long-chain amines include polyester amides and polyamides, such as the predominantly linear condensates obtained from reaction of (A) polybasic saturated and unsaturated carboxylic acids or their anyhydrides, and (B) polyvalent saturated or unsaturated aminoalcohols, diamines, polyamines, and the like, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5, 5-trimethyl- cyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazin-e, N,N,N'-tris-(2-aminoethyl)ethylene diamine, N-[N-(2-aminoethyl)-2-amino-ethyl]-N'-(2-aminoethyl)-piperazine, N-(2-aminoethyl)-N'-(2-piperazinoethy-1)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof.

Preferred diamines and polyamines include 1-amino-3-aminomethyl-3,5,5-tri-methyl-cyclohexane (isophorone diamine or IPDA), bis-(4-aminocyclohexyl)-m-ethane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine® D-2000 and D-4000, which are amine-terminated polypropylene glycols, differing only by molecular weight, and which are available from Huntsman Chemical Company.

Dispersion Enhancing Monomers

Another class of active hydrogen containing or isocyanate reactive compounds are dispersion enhancing monomers capable of serving as a crosslinking agent and contain a functional group such as a carboxylic, carbonyl, amine, hydroxyl, and hydrazide. These compounds are optional inasmuch as the poly(alkylene oxide) side-chain is fairly effective serving as a dispersing agent. When utilized, the typical amount of the dispersion enhancing and/or crosslinking compound is up to 1 milliequivalent, preferably from about 0.05 to about 0.5 milliequivalent, and more preferably from about 0.1 to about 0.3 milliequivalent per gram of final polyurethane on a dry weight basis. Desirable monomers include hydroxy-carboxylic acids having the general formula $(HO)_xQ(COOH)_y$, wherein Q is a straight or branched hydrocarbon radical having 1 to 12 carbon atoms, and x and y are 1 to 3. Examples of such hydroxy-carboxylic acids include citric acid, dimethylolpropanoic acid (DMPA), dimethylol butanoic acid (DMBA), glycolic acid, lactic acid, malic acid, dihydroxymalic acid, and combinations thereof. Dihydroxy-carboxylic acids are more preferred with dimethylolpropanoic acid (DMPA) being most preferred.

Other suitable compounds providing crosslinkability include thioglycolic acid, 2,6-dihydroxybenzoic acid, and the like, and mixtures thereof.

Preferred Isocyanate Reactive Compounds

Side Chain Containing Monomers

An essential polyol component of the present invention is a water dispersible enhancing compound such as the above noted side-chain containing poly(alkylene oxide) monomer wherein the side-chain contains a poly(ethylene oxide) side-chain with Tegomer D-3403 being highly preferred.

Preferred Polyols

A preferred class of polyols are the various polyethers derived from alkylene oxide compounds having from 2 to about 10 and desirably from about 3 to about 4 or about 6 carbon atoms. Specific examples include propylene oxide, butylene oxide, styrene oxide, tetrahydrofuran, epichlorohydrin, and the like as well as mixtures thereof. Preferred polyethers include polypropylene glycol with polytretrahydrofuran being highly preferred.

Dispersion Enhancing Monomers

The various above noted functional group containing crosslinking agent and/or dispersants have the formula $(HO)_xQ(COOH)_y$ with a highly preferred compound being DMPA.

Prepolymer Ratios of Isocyanate to Active Hydrogen-Containing Urethane Monomers

The equivalent ratio of isocyanate compounds to active hydrogen-containing monomers such as the one or more side-chain containing alkylene oxide monomers, the one or more polyols such as the polyethers, and the one or more different types of functional group containing crosslinking and/or dispersants is generally from about 1.3 to about 2.5, desirably from about 1.5 to about 2.1 and preferably from about 1.6 or about 1.7 to about 2.0.

Catalysts

The formation of the isocyanate-terminated prepolymer may be achieved without the use of a catalyst. However, a catalyst is preferred. Examples of suitable catalysts include stannous octoate, dibutyl tin dilaurate, and tertiary amine compounds such as triethylamine and bis-(dimethylaminoethyl) ether, morpholine compounds such as β,β'-dimorpholinodiethyl ether, bismuth carboxylates, zinc bismuth carboxylates, iron (III) chloride, potassium octoate, potassium acetate, and DABCO.® (diazabicyclo[2.2.2]octane), from Air Products. The preferred catalyst is a mixture of 2-ethylhexanoic acid and stannous octoate, e.g., FASCAT® 2003 from Elf Atochem North America. The amount of catalyst used is typically from about 5 to about 200 parts per million of the total weight of prepolymer reactants.

Prepolymer Neutralization

Optional neutralization of the prepolymer having pendant carboxyl groups converts the carboxyl groups to carboxylate anions, thus having a water-dispersibility enhancing effect. Suitable neutralizing agents include tertiary amines having from 1 to about 20 carbon atoms and desirably from 1 to about 5 carbon atoms, metal hydroxides such as sodium hydroxide and potassium hydroxide, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

Chain Extenders

As a chain extender, at least one of water, inorganic or organic polyamine having an average of about 2 or more primary and/or secondary amine groups, polyalcohols, ureas, or combinations thereof, is suitable for use in the present invention. Suitable organic amines for use as a chain extender have a total of from about 1 to about 10 carbon atoms and include diethylene triamine, ethylene diamine, meta-xylylenediamine, aminoethyl ethanolamine, 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable polyalcohols include those having from 2 to 12 carbon atoms, preferably from 2 to 8 carbon atoms, such as ethylene glycol, diethylene glycol, neopentyl glycol, butanediols, hexanediol, diethylene glycol terephthalic acid, and the like, and mixtures thereof. Suitable ureas include urea and it derivatives, and the like, and mixtures thereof. Hydrazine is preferred and is most preferably used as a solution in water. The amount of chain extender typically ranges from about 0.3 to about 1.5 and more desirably from about 0.5 to about 1.0 equivalents based on available isocyanate of the urethane prepolymer. If below 1.0, the balance will be chain extended by $H_2O$.

Polyurethane Dispersion Formation

The waterborne polyurethane is made in a conventional manner as known to the art and to the literature. For example, the various one or more active hydrogen-containing or isocyanate reactive monomers such as the side-chain alkylene oxide polyol, the polyether polyol such as Poly-THF, and the dispersion enhancing monomer or crosslinking agent, such as DMPA are added to a reaction vessel. A suitable isocyanate-containing compound is also added with heating from about 100° F. to about 250° F. and preferably from about 200° F. to about 230° F. optionally using a catalyst. A prepolymer is generally using an inert atmosphere such as nitrogen. Subsequently, the formed prepolymer can be neutralized and dispersed in water with agitation. A chain extender such as hydrazine is then added and reacted at temperatures of from about 50° F. to about 125° F. to form the polymer.

The waterborne polyurethanes of the present invention are generally in the form of a dispersion containing from about 20% to about 60% solid by weight and preferably from about 30% or about 35% to about 45% or about 50% solids by weight.

The above waterborne polyurethane dispersions of the present invention are set forth in U.S. patent application Ser. No. 10/174,899 filed Jun. 19, 2002, published as U.S. Publication No. 2003/0195293 on Oct. 16, 2003 which is hereby fully incorporated by reference with respect to all aspects thereof including all of the examples. Such waterborne polyurethanes are available from NOVEON, Inc. under the trade name PERMAX 200 and 220.

While a preferred route has been set forth with regard to preparation of a polyurethane dispersion, it is to be understood that other methods or routes known to the art as well as to the literature can be utilized. For example, the urethane prepolymers can be directly added to water containing a neutralizing agent therein. Moreover, the isocyanate can be reacted with various hydroxyl containing components as well as a chain extender with a formed polyurethane being subsequently neutralized and added to water. The amount of solids for the polyurethane dispersion is generally from about 25 to about 65% and preferably from about 30 to 45% by weight based upon the total weight of the polyurethane dispersion without any additives therein.

Blends of Vinyl or Acrylic Polymer—Polyurethane Dispersion

The present invention relates not only to blends of one or more vinyl or acrylic polymers with one or more urethane dispersions, but also to hybrid vinyl or acrylic polymer-urethane blends, dispersions, solutions, and the like including hybrid vinyl or acrylic-urethane particles as made by polymerizing the various one or more vinyl or acrylic monomers in the presence of a urethane prepolymers or polymer or by dispersing a urethane prepolymer into a vinyl or acrylic emulsion or solution.

Additives

To the above polyurethane dispersion composition and/or the vinyl or acrylic polymer composition, or a solution, or dispersion thereof is added desired additives such as an electrostatic dissipating compound, desirably a lubricant, and optionally the following: a defoamer, a surfactant, and a wax.

Various electrostatic dissipating (ESD) compounds are utilized to impart a desired surface and volume resistivity to compositions of the present invention and particularly to coatings, articles, or products made therefrom such that undesirable electrostatic charges are dissipated and build up of the same is abated. The various ESD compounds are desirably inorganic and include cations such as metals from groups 1 and 2 of the periodic table with various anions such as nitrates, sulfates, hydroxyls, halogens, and the like. Preferred compounds are lithium compounds such as LiCl, $LiNO_3$, LiOH, $LiCF_3SO_3$, $Li_2SO_4$, lithium (bis)trifluoromethanesulfonimide, and the like with $LiNO_3$ being preferred. The amount of the ESD compound is such that in combination with the polyurethane and/or the vinyl or acrylic composition, suitable surface and volume resistivities are achieved. Such amounts generally range from about 0.1 or 1.0 to about 8 or about 10 parts by weight and desirably from about 3 or to about 6 parts by weight per 100 total dry parts by weight of the one or more vinyl or acrylic polymers and the one or more waterborne polyurethane polymers. For ease of blending, the dissipative metal salts are generally added in an aqueous solution. Thus, upon drying of the antistatic dispersion, the salts are thoroughly dispersed throughout the composition. The use of lithium salts either alone or in association with a solvent is described in detail in U.S. Pat. No. 6,140,405 which is hereby fully incorporated by reference.

The anti-static hybrid urethane-vinyl or acrylic polymer compositions of the present invention, explained more fully hereinbelow, can be utilized as a coating, article, or a product. Desired surface resistivities thereof are from about $10^5$ to about $10^{12}$, and desirably from about $10^8$ to about $10^{11}$ ohm/square at 12% relative humidity. Desired volume resistivities thereof are from about $10_4$ to about $10^{11}$ ohm/cm at 12% relative humidity.

A lubricant or processing aid is optional but desired. Generally any such conventional compounds which are known to the art and to the literature can be utilized in amounts sufficient to impart good antiblocking properties, good moldability and good mold release. Generic types of such compounds generally include hydrocarbons, chlorinated hydrocarbons, and fluorocarbons having a total of from 2 to about 20 carbon atoms. Fluorocarbons are preferred since in addition to providing lubricity, they provide abrasion resistance and excellent water and alcohol repellency. In order to be cost effective, blends of hydrocarbons with fluorohydrocarbons are often utilized because of costs. Such fluorocarbons and blends thereof are known to the art and to the literature. A preferred fluorohydrocarbon is Freepel® FX-1202 made by Noveon, Inc. which is a blend of a hydrocarbon and a fluorocarbon and is generally ionic in nature.

Examples of other lubricants include various silicones, metal containing surfactants; waxes, and fatty acids, esters, or amides. Examples of metal containing surfactants include the various metallic stearates such as calcium stearate, zinc stearate, and magnesium stearate. Examples of suitable fatty acids include stearic acid, esters thereof and stearic amides.

The amount of the lubricants or processing aids can vary as from about 0.2 to about 10 and desirably from about 2 to about 4 or 5 dry weight parts per 100 dry parts by weight of the urethane and vinyl or acrylic polymers.

Generally, any defoamer can be utilized which is compatible with the hybrid urethane-vinyl or acrylic polymer blend compositions of the present invention and such defoamers are known to the art and to the literature. Examples of such defoamers include siloxanes, fluorocarbons, long chain alcohols, hydrocarbons and ethoxylates of the above in addition to reducing or eliminating any foam, the defoamers do not cause separation of the various components. Suitable defoamers are desirably nonionic and one such defoamer is Surfynol DF-37, a nonionic acetylenic-based defoamer made by Air Products and Chemicals, Inc.

The amount of the one or more defoamer components is generally from about 0.05 to about 1.0 parts by weight and desirably from about 0.25 to about 0.60 parts by weight based upon 100 dry parts by weight of the one or more waterborne polyurethanes and the one or more vinyl or acrylic polymers.

Suitable surfactants or wetting agents are known to the art and to the literature and literally hundreds of such compounds are available. With respect to the present invention, a surfactant is desired which acts as a fast wetting agent. Suitable surfactants generally include the surfactants set forth in 2003 McCutheon's Volume 1: Emulsifiers & Detergents (The Manufacturing Confectioner Publishing Company; Glen Rock, N.J.) hereby fully incorporated by reference. Generally desired surfactants include fluoroaliphatic ethoxylates such as Fluowet OTN (F/N) made by Hoechst Celanese, various polyfluoralkyl betaines such as Forafac 1157N (F/N) made by Atochem, various fluorinated alkyl polyoxyethylene ethanols such as Fluorad FC-170C (F/N) made by 3M, various anionic fluorinated surfactants such as Florafac 1033 (F/N) made by Atochem, various fluorinated alkyl alkoxlates such as Fluorad FC-171 (F/N) made by 3M, various ammonium perfluoroalkyl sufonates such as Flourad FC-120 (F/A) made by DuPont, various ammoniated phosphate fluorochemicals such as Zonyl FSP (F/A) made by DuPont, and C12-C15 linear primary alcohol ethoxylates such as Neodol 25-7 (H/N) made by Shell. Various sulfosuccinate can also be utilized. A specific example of a suitable surfactant is Aerosol® LF-4 made by Cytec Industries, Inc.

The amount of the one or more wetting agent components is generally from about 0.05 to about 2.0 parts by weight and desirably from about 0.2 to about 1.0 parts by weight based upon 100 dry parts by weight of the one or more waterborne polyurethanes and the one or more vinyl or acrylic polymers.

Suitable waxes are generally any conventional wax emulsion known to the art and to the literature such as hydrocarbon waxes, e.g. paraffin, chlorinated paraffin, and carnauba wax, with a nonionic polyethylene waterborne wax emulsion being preferred such as Michem® Emulsion 39235 made by Michelman Inc.

The amount of the wax emulsion is generally from about 0.05 to about 2.0 parts by weight and desirably from about 0.2 to about 1.0 parts by weight based upon 100 dry parts by weight of the one or more waterborne polyurethanes and the one or more vinyl or acrylic polymers.

Cross-linking agents are optional but often desirable and are utilized to produce good properties of the composition once applied to a suitable substrate. Crosslinking agents are desired which improve properties of coatings and articles such as strength; resistance to water and alcohol; improved chemical, abrasion, and mar resistance; improved adhesion; and the like. Suitable types of crosslinking agents include aziridines, melamines, isocyanates, carbodimides, epoxies, oxazolines, multivalent metal salts, and the like. A preferred crosslinking agent are the polyfunctional aziridines such as XAMA® 7 made by Bayer Polymers. This particular crosslinker contains three aziridine groups in a high molecular weight low volatile molecule containing ester groups. Each aziridine group can react with an active hydrogen donor, such as carboxyl groups, of the urethane and/or vinyl or acrylic polymers.

The XAMA® 7 is added to the formulated coating or article composition just prior to use. The crosslinking occurs at or slightly above room temperature.

When utilized, the amount of the one or more crosslinking agents is generally from about 1 to about 10 parts by weight, and preferably from about 3 to about 8 parts by weight based upon 100 dry parts by weight of the combined total weight of the one or more polyurethanes and the one or more vinyl or acrylic polymers.

After all of the additives are added to the blend of the polyurethane and vinyl or acrylic polymers and mixed, the pH of the blend, solutions, etc. is raised so that once the optional crosslinking agent is added, a longer pot life is achieved. A pH of generally from about 7.5 to about 10 is desired with a preferred pH being from about 8.0 to about 8.5. Suitable pH modifiers include alkaline compounds include ammonium hydroxide, potassium hydroxide, and the like.

Blending, Mixing, Etc.

The hybrid urethane-vinyl polymer, such as an acrylic polymer, compositions of the present invention, whether in solution or dispersion form, can generally be mixed in any order and subsequently the various additives such as the electrostatic dissipating compounds and lubricants added and mixed therewith. A preferred method of mixing the various components is as follows: if utilized, to a clean vessel is added the electrostatic dissipating compound such as an aqueous solution of lithium nitrate. The vinyl or acrylic polymer composition is then added to the vessel with agitation. Shortly thereafter, the urethane composition is added and the various components mixed for a short time such as about 5 minutes. The pH of the ingredients is adjusted to approximately 7 to 7.5 utilizing a base such as ammonium hydroxide. Subsequently, a defoamer and a surfactant can be added and the ingredients mixed for a short period of time such as about 5 minutes. The lubricating compound can then be added and mixed for a short period such as about 10 minutes followed by the addition of a wax which is subsequently mixed for a few minutes. Finally, optional additional electrostatic dissipating compounds are added to achieve a desired volume and surface resistivity of the composition, along with a pH modifier such as ammonium hydroxide to adjust the pH to approximately 8 to 8.5 with mixing for a short time period such as approximately 10 minutes. High pH is necessary to increase pot life after addition of the crosslinking agent.

The urethane-vinyl or acrylic polymer compositions of the present invention can utilize at least one lubricant and/or processing aid and be coated onto a polymer substrate or article to form a laminate. Such laminates unexpectedly have been found to have good thermoformable properties in that they are readily moldable, do not stick to the mold upon removal, and retain their desired electrostatic dissipating properties even after molding. In other words, the urethane-vinyl or acrylic polymer compositions of the present invention had good thermoformability inasmuch as when a product is removed from the mold, there is no sticking and the ease of separation is good. With respect to electrostatic dissipation properties, the urethane-vinyl or acrylic polymer blends of the present invention had good surface resistivity generally between 1.5E+10 to about 5.0E+10 ohm/square at room temperature with 12% relative humidity.

An important aspect of the present invention is while the blends contain polyurethane, when molded into an end product the same had good clarity. That is, light transmission according to ASTM D-1003 was at least 85%, desirably at least 90%, and preferably at least 93% whereas haze values according to ASTM D-1003 were generally less than about 5%, desirably less than about 4%, and preferably less than about 3%

Utility

The anti-static hybrid urethane-vinyl or acrylic polymer compositions of the present invention can be formed into numerous coatings, articles or products. If the coating is to be cured, the curing or crosslinking agent is added to the composition before the article or substrate is coated.

When utilized as a coating, the anti-static compositions of the present invention are added onto one or more substrates or articles and form a laminate. The laminate may have any number of layers such as from about 1 to about 4 or 5 and suitable substrates include polymers such as acrylonitrile-butadiene-styrene (ABS), polyphenylene oxide (PPO), polyester, PVC, polyethylene, polypropylene, acrylics, and the like. A total amount of solids of the urethane-vinyl or acrylic polymer compositions of the present invention generally ranges from about 25% to about 65% by weight and desirably from about 30% to about 45% by weight solids.

When utilized to form a laminate, the anti-static polymeric compositions of the present invention can be applied to a substrate or article generally at ambient temperature in any conventional manner as by coating, spraying, dipping, transfer (gravure), and the like. Once applied, the coated article is heated to a temperature below the Tg of the substrate to evaporate the water or solution and form a dry static dissipative polymer layer of a desired thickness. Drying temperatures are below the Tg of the substrate. As noted, if the composition contains a crosslinking agent, a thermoset coating or layer is formed.

Laminated end products or articles containing the urethane-vinyl or acrylic polymer compositions of the present invention include housings, covers, and the like for the electronic industries with specific examples including tote bins, electronic handling equipment, computer housings, electrical housings, electronic sub-assemblies, circuit boards, and the like. Other suitable end products include trays. Other significant areas of use are the various devices and articles for the medical field.

Since the urethane-acrylic composition is clear, a desired area of use is for coatings for electronic display screens.

The following examples serve to illustrate, but not to limit, the present invention.

EXAMPLES

The urethane polymer dispersion is obtained from NOVEON Chemicals Inc. of Cleveland, Ohio as Permax 220. This compound was made in accordance with U.S. patent application Ser. No. 10/174,899, such as set forth in Examples 18 and 25, filed Jun. 19, 2002 generally in the following manner.

Example 1A

Prepolymer Step

The following materials were charged to a reactor: 67 grams PTHF 1000 and 300 grams Tegomer D-3403. Then with mixing, 133 grams IPDI were charged. The reactor was heated to 210-220° F. and after 30 minutes, two drops of FASCAT® 2003 catalyst were added. The mixture was stirred for 3 hours under the blanket of nitrogen. The remaining NCO was found to be 3.7% by titration with DBA and 1.0M HCl. The reactor was cooled to 150° F. for transfer of the prepolymer to another reactor.

Extension Step

Prepolymer (400 grams) was charged over the course of about 10 minutes with mixing into a reactor containing 915 grams water at 65° F. The mixture was stirred for 30 minutes to form a dispersion, and 10 grams of hydrazine solution were added over approximately 10 minutes.

Dispersion properties: total solids=29 wt. %, pH=6.4, Brookfield viscosity=100 cP, particle size=165 nm.

Example 1B

Prepolymer Step

The following materials were charged to a reactor: 216 grams PTHF 1000, 21.5 grams DMPA and 150 grams Tegomer D-3403. Then with mixing, 212 grams IPDI were charged. The reactor was heated to 210-220° F. and after 30 minutes, two drops of FASCAT® catalyst were added. The mixture was stirred for 3.5 hours under a nitrogen blanket. The remaining NCO was found to be 5.5% by titration with DBA and 1.0M HCl. The prepolymer was cooled to 140° F. for transfer to another reactor.

Extension Step

Prepolymer (500 grams) was charged over the course of about 10 minutes with mixing into a reactor containing 850 grams water and 0.5 grams DeeFo 97-3 defoamer at 70° F. The mixture was stirred for 25 minutes to form a dispersion, and 19 grams of hydrazine solution were added over approximately 10 minutes.

Dispersion properties: total solids=37.3 wt. %, pH=5.5, Brookfield viscosity=480 cP, particle size=155 nm.

With regard to Examples 1A and 1B, percent solids can be varied by either adding or taking away water. The urethane polymer of Example 1B was utilized in Table 1.

Example 2

The acrylic polymer composition was made in accordance with U.S. patent application Ser. No. 09/609,077 filed Jun. 30, 2000, Example 2 thereof. Specifically, an emulsion polymer of 15 wt. % MePEGMA, styrene, methyl methacrylate, and methacrylic acid was made by emulsion polymerization. A monomer premix was made by mixing 195 grams of water, 0.65 grams of sodium bicarbonate, 11.21 grams of an ammonium salt of nonyl phenol ethoxylated sulfate, 4.33 grams ammonium salt of lauryl ether sulfate, 214.5 grams of styrene, 162.5 grams of n-butyl acrylate, 198.98 grams 50% aqueous solution of MePEGMA having an average number of ethylene glycol units of about 20 (or in other words DP~20), 156 grams of methyl methacrylate, and 19.5 grams of methacrylic acid. Initiator solution-A was made by dissolving 1.3 grams of sodium persulfate in 6.5 grams of water. Initiator solution-B was made by dissolving 1.63 grams of sodium persulfate in 6.5 grams of water. 520 grams of water, 0.33 grams of sodium bicarbonate, and 0.22 grams ammonium salt of nonyl phenol ethoxylated sulfate were charged to a 3-liter reaction vessel and heated to 84° C. Initiator A was then added to the reaction vessel, followed by proportioning the monomer premix and initiator solution-B to the reaction vessel over a period of about 3 hours and 3½ hours respectively. After completion of initiator B feed, the temperature of the reaction vessel was maintained at 84° C. for 1 hour. The reaction vessel then was cooled to 57° C. 2.29 grams of 17% aqueous solution of t-butyl hydroperoxide and 20.15 grams of 3.2 wt. % solution of sodium formaldehyde sulfoxylate were added to the reaction vessel about 5 minutes apart. After 30 minutes, the reaction vessel was cooled to room temperature and filtered through 100-micron cloth. The pH of the product emulsion was adjusted to 7.8-9.0 with ammonium hydroxide before use and contained about 41 wt. % total solids.

Table 1 relates to a recipe setting forth various compositions wherein the amount of polyurethane and acrylic polymer were varied in Examples A through F.

TABLE 1

| | parts | % solids | solids amt | sp grav. | volume | solids-% of composition | 100 parts by wt of acrylic-polyurethane | |
|---|---|---|---|---|---|---|---|---|
| Permax 220 (PUD) | 15.0 | 35.00 | 5.25 | 1.03 | 14.56 | 11.34 | 12.96 | } 100 pts wt |
| Carboset XPD-2789 (acrylic polymer) | 85.0 | 41.50 | 35.28 | 1.10 | 77.27 | 76.18 | 87.04 | |
| Freepel FX1202 (Lubricant) | 5.0 | 26.00 | 1.30 | 1.02 | 4.90 | 2.81 | 3.21 | |
| 33% lithium nitrate solution in water | 5.5 | 33.33 | 1.83 | 1.24 | 4.44 | 3.96 | 4.52 | |
| Surfynol DF37 (Defoamer) | 0.35 | 50.00 | 0.18 | 0.98 | 0.36 | 0.38 | 0.43 | |
| Cytec Aerosol LF-4 (surfactant) | 0.30 | 80.00 | 0.24 | 1.10 | 0.27 | 0.52 | 0.57 | |
| Michem Emulsion 39235 (wax) | 0.75 | 31.00 | 0.23 | 1.44 | 0.52 | 0.50 | 0.57 | |
| Ammonia-28% | 0.60 | 0.00 | 0.00 | | | 0.00 | | |
| SUBTOTAL | 112.50 | 296.83 | 44.31 | | 102.32 | 95.68 | | |
| Xama 7 (to be added later) | 2.00 | 100.00 | 2 | 1.185 | 1.69 | 4.32 | 4.94 | |
| TOTAL | 114.5 | | 46.31 | 1.099 | | 100.0 | | |

The above recipe was compounded as follows:

Premix the 33.3% lithium nitrate solution in a clean vessel. Mix until the crystals have all dissolved. Charge Carboset XPD-2789 to compounding vessel, begin agitation. Charge Permax 220 to compounding vessel. Mix about 5 minutes. Adjust pH to 7 to 7.5 with ammonium hydroxide solution. Mix for about 10 minutes, keeping a good vortex. Record (approximate) amount of ammonium hydroxide used. Charge Surfynol DF37 to vessel. Charge Cytec Aerosol LF-4 to vessel. Mix about 5 minutes. Charge Freepel FX1202 to compounding vessel, mix about 10 minutes, increasing agitation to keep a vortex. Charge Michem Emulsion 39235 to vessel. Mix for several minutes. Charge 33.3% LiNO$_3$ to vessel. Add slowly into the vortex. Mix about 10 minutes. Adjust pH to 8 to 8.5 with ammonium hydroxide solution. Mix about 10 minutes, keeping a good vortex. Continue mixing for approximately 10 minutes.

In a similar manner, varying amounts of the polyurethane and the acrylic polymer ranging from 0 to 100 parts by weight of each component were blended with the amount of additives set forth in Table 1. The results of various physical properties thereof are set forth in Table 2.

The compounded compositions were then formed into a sheet of approximately 0.03 inches thickness and tested. The results are set forth in Table 2.

TABLE 2

| | A | B | C | D | E | F | G |
|---|---|---|---|---|---|---|---|
| Noveon Carboset -acrylic (parts wt.) | 0 | 20 | 40 | 60 | 80 | 85 | 100 |
| Permax™ 220 (TPU) (parts wt.) | 100 | 80 | 60 | 40 | 20 | 15 | 0 |
| Surface Resistivity @ 50% rh (ohm/sq) | 8.7E+8 | 2.7E+8 | 9.9E+8 | 4.6E+7 | 2.4E+7 | — | 1.9E+7 |
| Surface Resitivity @ 12% rh (ohm/sq) | 1.0E+12 | 6.0E+11 | 2.2E+11 | 6.5E+10 | 1.7E+10 | — | 1.7E+10 |
| Optical Properties-ASTM D-1003 | | | | | | | |
| Light Transmission | — | — | — | — | — | >94.1%* | — |
| Haze % | — | — | — | — | — | <3.2%* | — |
| Mold releasability | very good | very good | very good | very good | very good | very good | very good |

*These values were obtained utilizing a 0.4 mil thickness coating of the present invention on a 4.2 mil thick mylar substrate.

As apparent from the above table, as the amount of the acrylic component was increased, good surface resistivity properties were obtained.

The above example was coated at a thickness of 0.4 mils and tested with regard to light transmission and haze values. The values set forth in Table 2, Example F, do not represent the actual values of the coating inasmuch as the thick mylar backing would inhibit some of the light from passing through and also increase the haze value content.

While in accordance with the Patent Statutes the best mode and preferred embodiment have been set forth, the scope of the invention is not limited thereto but rather by the scope of the attached claims.

What is claimed is:

1. A polymer composition, comprising:
at least one vinyl polymer and at least one polyurethane; and
optionally an electrostatic dissipating compound;
said vinyl polymer comprising:
polymerized units of (a) at least one reactive macromer of at least one alkylene oxide and having at least one functional group capable of free-radical transformation, wherein said macromer has a number average molecular weight of from about 100 to about 10,000, said macromer having the formula $X-(Y\text{-}0)_n\text{-}Z$ wherein Y is a straight or branched chain alkylene radical having 1 to 6 carbon atoms, X is a functional group capable of free-radical transformation selected from the group consisting of an acrylate, a methacrylate, an allyl ether, a vinyl ether, vinylbenzyl, and a vinylsulfonic ester, Z is H, $C_mH_{2m+1}$, phosphate, or the same as X, m is 1 to 50, and n varies in order to achieve said molecular weight;
optionally polymerized units of (b) at least one or more ethylenically unsaturated monomers having at least one carboxylic acid group; and
polymerized units of (c) one or more free radically polymerizable monomers selected from the group consisting of an ester, a nitrile, an amide of an unsaturated carboxylic acid having from 3 to about 10 carbon atoms, a vinyl ester, a styrenic monomer, an olefin, a halogenated olefin, a conjugated diene, a halogenated conjugated diene, a vinyl ether, an allyl ether, an unsaturated ester of phosphoric acid, and combinations thereof;
said polyurethane comprising:
polymerized units of (ua) a side chain containing alkylene oxide monomer in an amount of about 12 wt. % to about 80 wt. % of said polyurethane, wherein (i) alkylene oxide groups in said poly(alkylene oxide) side-chain units have from 2 to about 10 carbon atoms (ii) at least about 50 wt. % of said alkylene oxide groups are ethylene oxide, and (iii) said amount of said side-chain units is at least about 12 wt. %,
polymerized units of (ub) at least one hydroxyl or amine containing monomer selected from the group consisting of a polyester polyol, a polyether polyol, a polyhydroxy polyester amide, a hydroxyl-containing polycaprolactone, a hydroxyl-containing epoxide, a polyhydroxy polycarbonate, a polyhydroxy polyacetal, a polyhydroxy polythioether, a polysiloxane polyol, an ethoxylated polysiloxane polyol, a hydrocarbon polyol, a polybutadiene polyol, a hydrogenated polybutadiene polyol, a polyacrylate polyol, a polymethacrylate polyol, a halogenated polyester, a halogenated polyether, a polyamine, and combinations thereof;
optionally polymerized units of (uc) at least one dispersion enhancing monomer having a functional group selected from the group consisting of a carboxylic, a carbonyl, an amine, a hydroxyl, a hydrazide, and combinations thereof;
polymerized units of a chain extender selected from the group consisting of water, an inorganic polyamine having an average of about 2 or more primary and/or secondary amine groups, an organic polyamine having an average of about 2 or more primary and/or secondary amine groups, a polyalcohol, a urea, and combinations thereof; and
polymerized units of an isocyanate compound reactive with said (ua) side chain containing alkylene oxide monomer, said (ub) hydroxyl or amine containing monomer, and said (uc) dispersion enhancing monomer; wherein said isocyanate is a polyisocyanate having an average of about 2 or more isocyanate groups, and wherein said polyisocyanate is selected from the group consisting of an aliphatic, a cycloaliphatic, an araliphatic, an aromatic, and combinations thereof.

2. The composition according to claim 1, wherein the amount of said (a) macromer is from about 0.1% to about 50% by weight based upon the total dry weight of said vinyl polymer;
wherein said (b) ethylenically unsaturated monomer having at least one carboxylic acid group selected from the group consisting of acrylic acid, methacrylic acid, itaconic acid, maleic acid, maleic anhydride, fumaric acid, crotonic acid, vinylacetic acid, mesaconic acid, citraconic acid, 2-acrylamido-2-methylpropanesulfonic acid, alkali metal salts of the above acids, amine salts of the above acids and ammonium salts of the above acids.

3. The composition according to claim 2, wherein the amount of said vinyl polymer is from about 10% to about 95% dry weight based upon the total dry weight of said vinyl polymer and said polyurethane;
wherein said (a) macromer comprises polymerized units of methoxy polyethylene oxide (meth)acrylate, said macromer having a number average molecular weight of from about 100 to about 5,000;
including said (b) ethylenically unsaturated monomer having at least one carboxylic acid group in the amount of from about 0.1% by weight to about 10% by weight based upon the total dry weight of said vinyl polymer;
wherein said (c) one or more free radically polymerized monomers selected from the group consisting of acrylic esters, methacrylic esters, styrenic monomers, and combinations thereof;
wherein said (ua) side chain containing alkylene oxide monomer is about 14 wt. % to about 60 wt. % of said polyurethane;
wherein said (ub) hydroxyl containing monomer is selected from the group consisting of a polyester polyol, a polyether polyol, and combinations thereof; and
wherein said isocyanate compound is selected from the group consisting of an aliphatic polyisocyanate, a cycloaliphatic polyisocyanate, and combinations thereof.

4. The composition according to claim 3, wherein the amount of said vinyl polymer is from about 45% to about 95% dry weight based upon the total dry weight of said vinyl polymer and said polyurethane, wherein the amount of said (a) macromer is from about 1 to about 30% by weight based upon the total dry weight of said vinyl polymer, wherein X of said macromer is selected from the group consisting of acrylate and methacrylate, wherein Y has 2 to 4 carbon atoms, and Z is hydrogen or methyl;
wherein said (c) free radically polymerizable acrylic ester or methacrylic ester monomers have the formula

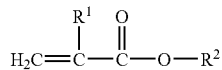

wherein $R^1$ is hydrogen or a methyl group, and $R^2$ contains 1 to 50 carbon atoms and optionally also one or more sulfur, nitrogen, halogen or oxygen atoms;
  including said (uc) dispersion enhancing monomer, said (uc) monomer having the formula $(HO)_xQ(COOH)_y$, wherein Q is a straight or branched hydrocarbon radical having 1 to 12 carbon atoms, and wherein x and y are 1 to 3;
  wherein said chain extender is selected from the group consisting of water, an amine, an inorganic amine, and combinations thereof;
  wherein said isocyanate compound is a cycloaliphatic polyisocyanate.

5. The composition according to claim 4, wherein said (a) macromer has the formula

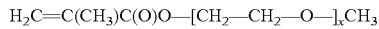

wherein x is from about 18 to about 23;
  wherein said (b) one or more ethylenically unsaturated monomers having at least one carboxylic acid group is selected from the group consisting of acrylic acid, methacrylic acid, and combinations thereof;
  wherein said (c) one or more free radically polymerizable monomers is selected from the group consisting of styrene, n-butyl acrylate, methyl methacrylate, and combinations thereof;
  wherein said (ua) side chain containing alkylene oxide monomer is trimethylol propane monoethoxylate methyl ether;
  wherein said (ub) hydroxyl containing monomer is derived from a compound selected from the group consisting of tetrahydrofuran, propylene oxide, butylene oxide, styrene oxide, epichlorohydrin, propylene glycol, and combinations thereof;
  wherein said (uc) dispersion enhancing monomer is selected from the group consisting of citric acid, dimethylolpropanoic acid (DMPA), dimethylol butanoic acid (DMBA), glycolic acid, lactic acid, malic acid, dihydroxymalic acid, and combinations thereof;
  wherein said chain extender is selected from the group consisting of water, hydrazine, and combinations thereof; and
  wherein said isocyanate compound is selected from the group consisting of dicyclohexylmethane diisocyanate, isophorone diisocyanate, and combinations thereof.

6. The composition according to claim 5, wherein the amount of said acrylic polymer is from about 80% to about 93% by weight based upon the total dry weight of said vinyl polymer and said polyurethane;
  wherein said (ub) hydroxyl containing polyol is polytetrahydrofuran, and including said dispersion enhancing monomer.

7. A vinyl polymer-polyurethane composition comprising, the dry composition of claim 1.

8. A vinyl polymer-polyurethane composition comprising, the dry composition of claim 3.

9. A vinyl polymer-polyurethane composition comprising, the dry composition of claim 5.

10. The composition of claim 7, having a surface resistivity at 12% relative humidity of from about $10^5$ to about $10^{12}$ ohm/square.

11. The composition of claim 9, having a surface resistivity at 12% relative humidity of from about $10^8$ to about $10^{11}$ ohm/square.

12. The composition of claim 7, including an electrostatic dissipating compound, said composition having a surface resistivity at 12% relative humidity of from about $10^5$ to about $10^{12}$ ohm/square.

13. The composition of claim 9, including an electrostatic dissipating compound, said electrostatic dissipating compound selected from the group consisting of LiCl, $LiNO_3$, LiOH, $LiCF_3SO_3$, $Li_2SO_4$, lithium (bis)trifluoromethanesulfonimide, and combinations thereof, said composition having a surface resistivity at 12% relative humidity of from about $10^8$ to about $10^{11}$ ohm/square.

14. The composition of claim 10, having an ASTM D-1003 light transmission of at least 85%.

15. The composition of claim 11, having an ASTM D-1003 light transmission of at least about 90%.

16. The composition of claim 13, having an ASTM D-1003 light transmission of at least about 93% and an ASTM D-1003 haze value of less than about 4%.

17. The composition of claim 10, including a lubricant, and wherein said composition is thermoformable.

18. The composition of claim 11, including a lubricant, wherein said lubricant is selected from the group consisting of a hydrocarbon, a chlorinated hydrocarbon, a fluorocarbon having a total of from 2 to about 20 carbon atoms, a silicone, a metallic soap, a wax, a fatty acid, ester, amide; and combinations thereof; and wherein said composition is thermoformable.

19. The composition of claim 13, including a fluorocarbon having a total of from 2 to about 20 carbon atoms, wherein the amount of said lubricant is from about 2 to about 10 parts by weight for 100 total dry parts by weight of said acrylic polymer and said polyurethane, and wherein said composition is thermoformable.

20. A coated substrate comprising: the composition of claim 7 on a polymer substrate.

21. A coated substrate comprising: the composition of claim 9 on a polymer substrate.

22. A coated substrate comprising: the composition of claim 10 on a polymer substrate.

23. A coated substrate comprising: the composition of claim 13 on a polymer substrate.

24. A coated substrate according to claim 20, wherein said polymer substrate is selected from the group consisting of ABS, polyphenylene oxide (PPO), polyester, PVC, polyethylene, polypropylene, an acrylic, and combinations thereof.

25. A coated substrate according to claim 23, wherein said polymer substrate is selected from the group consisting of ABS, polyphenylene oxide (PPO), polyester, PVC, polyethylene, polypropylene, an acrylic, and combinations thereof.

26. A coated substrate according to claim 15, wherein said polymer substrate is selected from the group consisting of ABS, polyphenylene oxide (PPO), polyester, PVC, polyethylene, polypropylene, an acrylic, and combinations thereof, and wherein said laminate is selected from the group consisting of a tote bin, a computer housing, an electrical housing, an electronic sub-assembly, a circuit board, a tray, and combinations thereof.

27. A laminate according to claim 22, wherein said laminate is selected from the group consisting of a tote bin, a computer housing, an electrical housing, an electronic sub-assembly, a circuit board, a tray, and combinations thereof.

28. A laminate according to claim 26, wherein said laminate is selected from the group consisting of a tote bin, a computer housing, an electrical housing, an electronic sub-assembly, a circuit board, a tray, and combinations thereof.

29. A laminate according to claim 16, wherein said laminate is selected from the group consisting of a tote bin, a computer housing, an electrical housing, an electronic sub-assembly, a circuit board, a tray, and combinations thereof.

30. A process for providing a composition of at least one vinyl polymer and at least one polyurethane dispersion, comprising the steps of:
A) preparing a vinyl polymer comprising: polymerizing
    (a) at least one reactive macromer of at least one alkylene oxide having at least one functional group capable of free-radical transformation, wherein said macromer has a number average molecular weight of from about 100 to about 10,000, said macromer having the formula X—(Y-0)$_n$-Z wherein Y is a straight branched chain alkylene radical having 1 to 6 carbon atoms, X is a functional group capable of free-radical transformation selected from the group consisting of an acrylate, a methacrylate, an allyl ether, a vinyl ether, vinylbenzyl, a vinylsulfonic ester, Z is H, $C_mH_{2m+1}$, phosphate, the same as X, m is 1 to 8, and n varies in order to achieve said molecular weight;
    optionally (b) at least one more ethylenically unsaturated monomers having at least one carboxylic acid group; and
    (c) one more free radically polymerizable monomers selected from the group consisting of an ester, a nitrile, an amide of an unsaturated carboxylic acid having from 3 to about 10 carbon atoms, a vinyl ester, a styrenic monomer, an olefin, a halogenated olefin, a conjugated diene, a halogenated conjugated diene, a vinyl ether, an allyl ether, an unsaturated ester of phosphoric acid, and combinations thereof; and
B) forming a polyurethane dispersion, comprising the steps of
    polymerizing at least one (ua) side chain containing alkylene oxide monomer in an amount comprising about 12 wt. % to about 80 wt. % of said polyurethane, wherein (i) alkylene oxide groups in said poly(alkylene oxide) side-chain units have from 2 to 10 carbon atoms (ii) at least about 50 wt. % of said alkylene oxide groups are ethylene oxide, and (iii) said amount of said side-chain units is at least about 12 wt. %;
    polymerizing at least one (ub) hydroxyl amine containing monomer selected from the group consisting of a polyester polyol, a polyether polyol, a polyhydroxy polyester amide, a hydroxyl-containing polycaprolactones, a hydroxyl-containing epoxide, a polyhydroxy polycarbonate, a polyhydroxy polyacetal, a polyhydroxy polythioether, a polysiloxane polyol, a hydrocarbon polyol, an ethoxylated polysiloxane polyol, a polybutadiene polyol, a hydrogenated polybutadiene polyol, a polyacrylate polyol, a polymethacrylate polyol, a halogenated polyester, a halogenated polyether, a polyamine, and combinations thereof;
    optionally polymerizing at least one (uc) dispersion enhancing monomer having a functional group selected from the group consisting of a carboxylic, a carbonyl, an amine, a hydroxyl, a hydrazide, and combinations thereof; and
    with one more isocyanate compounds and forming a urethane, wherein said isocyanate is a polyisocyanate having an average of about 2 more isocyanate groups, and is selected from the group consisting of an aliphatic, a cycloaliphatic, an araliphatic, an aromatic polyisocyanate, and combinations thereof;
    dispersing said urethane in water, and chain extending said urethane by reaction with a compound selected from the group consisting of water, an inorganic polyamine having an average of from about 2 more primary and/or secondary amine groups, an organic polyamine having an average of about 2 more primary and/or secondary amine groups, a polyalcohol, a urea, and combinations thereof; and
C) mixing said acrylic polymer and said polyurethane dispersion.

31. A process according to claim 30, wherein the amount of said (a) macromer is from about 0.1% to about 50% by weight based upon the total dry weight of said vinyl polymer;
wherein said (b) ethylenically unsaturated monomer having at least one carboxylic acid group is selected from the group consisting of acrylic acid, methacrylic acid, itaconic acid, maleic acid, maleic anhydride, fumaric acid, crotonic acid, vinylacetic acid, mesaconic acid, citraconic acid, 2-acrylamido-2-methylpropanesulfonic acid, alkali metal salts of the above acids, or amine salts of the above acids and ammonium salts of the above acids.

32. A process according to claim 31, wherein the amount of said vinyl polymer is from about 45% to about 95% by weight based upon the total dry weight of said vinyl polymer and said polyurethane;
wherein said (a) macromer comprises polymerized units of methoxy polyethylene oxide (meth)acrylate, said macromer having a number average molecular weight of from about 100 to about 5,000;
including said (b) ethylenically unsaturated monomer having at least one carboxylic acid group in the amount of from about 0.1% by weight to about 10% by weight based upon the total dry weight of said acrylic polymer;
wherein said (c) one more free radically polymerized monomers is selected from the group consisting of acrylic esters, methacrylic esters, styrenic monomers, and combinations thereof;
wherein said (ua) side chain containing alkylene oxide monomer comprises about 14 wt. % to about 60 wt. % of said polyurethane;
wherein said (ub) hydroxyl containing monomer compound is selected from the group consisting of a polyester polyol, a polyether polyol, and combinations thereof; and
wherein said isocyanate compound is selected from the group consisting of an aliphatic polyisocyanate, a cycloaliphatic polyisocyanate, and combinations thereof.

33. A process according to claim 32, wherein the amount of said (a) macromer is from about 1 to about 30% by weight based upon the total dry weight of said vinyl polymer, wherein X of said macromer is selected from the group consisting of acrylate, and methacrylate, wherein Y has 2 to 4 carbon atoms, and Z is hydrogen methyl;
wherein said (c) free radically polymerizable acrylic ester methacrylic ester monomers have the formula

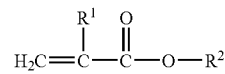

wherein $R^1$ is hydrogen a methyl group, and $R^2$ contains 1 to 12 carbon atoms and optionally also one more sulfur, nitrogen, halogen oxygen atoms;

wherein (uc) said dispersion enhancing monomer has the formula $(HO)_xQ(COOH)_y$, wherein Q is a straight branched hydrocarbon radical having 1 to 12 carbon atoms, and wherein x and y are 1 to 3;

wherein said chain extender is selected from the group consisting of water, an amine, an inorganic amine, and combinations thereof;

wherein said isocyanate compound is a cycloaliphatic polyisocyanate.

34. A process according to claim 33, wherein said (a) macromer has the formula $$H_2C=C(CH_3)C(O)O-[CH_2-CH_2-O-]_xCH_3$$

wherein x is from about 18 to about 23;

wherein said (b) one more ethylenically unsaturated monomers having at least one carboxylic acid group is selected from the group consisting of acrylic acid, methacrylic acid, and combinations thereof;

wherein said (c) one more free radically polymerizable monomers is selected from the group consisting of styrene, n-butyl acrylate, methyl methacrylate, and combinations thereof;

wherein said (ua) side chain containing alkylene oxide monomer is trimethylol propane monoethoxylate methyl ether;

wherein said (ub) hydroxyl containing monomer is derived from a compound selected from the group consisting of tetrahydrofuran, propylene oxide, butylene oxide, styrene oxide, epichlorohydrin, propylene glycol, and combinations thereof;

including said (uc) dispersion enhancing monomer which is selected from the group consisting of citric acid, dimethylolpropanoic acid (DMPA), dimethylol butanoic acid (DMBA), glycolic acid, lactic acid, malic acid, dihydroxymalic acid, and combinations thereof; and wherein said chain extender is selected from the group consisting of water, hydrazine, and combinations thereof.

35. A process according to claim 34, wherein the amount of said acrylic polymer is from about 60% to about 93% by weight based upon the total dry weight of said vinyl polymer and said polyurethane; and wherein said (ub) hydroxyl containing polyol is polytetrahydrofuran.

36. A process according to claim 30, including drying said blend and forming a polymer blend having a surface resistivity at 12% relative humidity of from about $10^5$ to about $10^{12}$ ohm/square.

37. A process according to claim 31, including drying said blend and forming a polymer blend having a surface resistivity at 12% relative humidity of from about $10^5$ to about $10^{12}$ ohm/square.

38. A process according to claim 33, including drying said blend and forming a polymer blend having a surface resistivity at 12% relative humidity of from about $10^5$ to about $10^{12}$ ohm/square.

39. A process according to claim 34, including drying said blend and forming a polymer blend having a surface resistivity at 12% relative humidity of from about $10^8$ to about $10^{11}$ ohm/square, and a volume resistivity of from about $10^4$ to about $10^{11}$ ohm.cm.

40. A process according to claim 35, including drying said blend and forming a polymer blend having a surface resistivity at 12% relative humidity of from about $10^8$ to about $10^{11}$ ohm/square, and a volume resistivity of from about $10^4$ to about $10^{11}$ ohm·cm.

41. A process according to claim 36, wherein said polymer blend has light transmission per ASTM D-1003 of at least 85%.

42. A process according to claim 37, wherein said polymer blend has light transmission per ASTM D-1003 of at least about 85%.

43. A process according to claim 39, wherein said polymer blend has light transmission per ASTM D-1003 of at least about 90%.

44. A process according to claim 40, wherein said polymer blend has light transmission per ASTM D-1003 of at least about 93%.

45. A process according to claim 36, including a lubricant, and wherein said composition is thermoformable.

46. A process according to claim 39, including a lubricant, wherein said lubricant is selected from the group consisting of a hydrocarbon, a chlorinated hydrocarbon, a fluorocarbon having a total of from 2 to about 20 carbon atoms, a silicone, a metallic soap, a wax, a fatty acid, ester, amide; and combinations thereof; and wherein said composition is thermoformable.

47. A process according to claim 44, including a fluorocarbon having a total of from 2 to about 20 carbon atoms, wherein the amount of said lubricant is from about two to about ten parts by weight for 100 total dry parts by weight of said acrylic polymer and said polyurethane, and wherein said composition is thermoformable.

* * * * *

UNITED STATES PATENT AND TRADEMARK OFFICE
CERTIFICATE OF CORRECTION

PATENT NO.         : 7,358,295 B2                                   Page 1 of 1
APPLICATION NO.    : 10/849582
DATED              : April 15, 2008
INVENTOR(S)        : Timothy D. Miller et al.

It is certified that error appears in the above-identified patent and that said Letters Patent is hereby corrected as shown below:

In column 27, claim 30, line 18, please insert after the word "straight", the word --or--.

In column 27, claim 30, line 24, please insert before the word "the", the word --or--.

In column 28, claim 31, line 23, please delete the word "or".

In column 28, claim 33, line 58, please insert after the word "hydrogen", the word --or--.

In column 28, claim 33, line 59, please insert after the word "ester", the word --or--.

In column 29, claim 33, line 6, please insert before the word "branched", the word --or--.

Signed and Sealed this

Eighth Day of July, 2008

JON W. DUDAS
*Director of the United States Patent and Trademark Office*